United States Patent
Liu et al.

(10) Patent No.: US 10,395,167 B2
(45) Date of Patent: Aug. 27, 2019

(54) IMAGE PROCESSING METHOD AND DEVICE

(71) Applicant: BOE Technology Group Co., Ltd., Beijing (CN)

(72) Inventors: Hanwen Liu, Beijing (CN); Pablo Navarrete Michelini, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/712,654

(22) Filed: Sep. 22, 2017

(65) Prior Publication Data
US 2018/0211157 A1    Jul. 26, 2018

(30) Foreign Application Priority Data

Jan. 25, 2017   (CN) .......................... 2017 1 0060897

(51) Int. Cl.
| | | |
|---|---|---|
| G06N 3/04 | (2006.01) | |
| G06K 9/46 | (2006.01) | |
| G06T 3/40 | (2006.01) | |
| G06K 9/62 | (2006.01) | |

(52) U.S. Cl.
CPC ............. *G06N 3/0454* (2013.01); *G06K 9/46* (2013.01); *G06K 9/6232* (2013.01); *G06T 3/4007* (2013.01); *G06T 3/4046* (2013.01)

(58) Field of Classification Search
CPC ............... G06N 3/04; G06T 3/40; G06K 9/46
See application file for complete search history.

(56) References Cited

U.S. PATENT DOCUMENTS

| | | | |
|---|---|---|---|
| 9,530,071 B2 | 12/2016 | Yin et al. | |
| 9,977,997 B2 * | 5/2018 | Bai ....................... | G06K 9/4604 |
| 10,181,091 B2 * | 1/2019 | Song .................... | G06K 9/6212 |

(Continued)

FOREIGN PATENT DOCUMENTS

| | | |
|---|---|---|
| CN | 104574277 A | 4/2015 |
| CN | 104732274 A | 6/2015 |
| CN | 105005774 A | 10/2015 |
| CN | 105981051 A | 9/2016 |

(Continued)

OTHER PUBLICATIONS

Gatys et al. "A Neural Algorithm of Artistic Style", arXiv:1508.06576v2 [cs.CV], dated, Sep. 2, 2015, 16 pages.

(Continued)

*Primary Examiner* — Mia M Thomas
(74) *Attorney, Agent, or Firm* — Westman, Champlin & Koehler, P.A.

(57) ABSTRACT

An image processing method and an image processing device are provided. The image processing method includes steps of extracting a feature of an inputted first image by a first CNN, and reconstructing and outputting an image by a second CNN. The first CNN includes a plurality of first convolutional layers connected sequentially to each other and a plurality of first pooling layers each arranged between respective adjacent first convolutional layers, and each first convolutional layer is configured to generate and output a first convolutional feature. The second CNN includes a plurality of second convolutional layers connected sequentially to each other and a plurality of composite layers each arranged between respective adjacent second convolutional layers, and each composite layer is an up-sampling layer.

20 Claims, 6 Drawing Sheets

(56) References Cited

U.S. PATENT DOCUMENTS

| | | | |
|---|---|---|---|
| 10,223,610 B1* | 3/2019 | Akselrod-Ballin | ........................... G06K 9/6218 |
| 10,289,897 B2* | 5/2019 | Tang | .................. G06K 9/00281 |
| 2015/0213302 A1* | 7/2015 | Madabhushi | ...... G06K 9/00147 382/133 |
| 2016/0104053 A1 | 4/2016 | Yin et al. | |
| 2016/0148080 A1 | 5/2016 | Yoo et al. | |
| 2016/0225125 A1 | 8/2016 | Zhang et al. | |
| 2016/0275341 A1* | 9/2016 | Li | ........................... G06T 13/40 |
| 2017/0011291 A1 | 1/2017 | Jin et al. | |
| 2017/0169315 A1* | 6/2017 | Vaca Castano | ...... G06K 9/3233 |
| 2017/0220904 A1* | 8/2017 | Bai | ...................... G06K 9/4604 |
| 2017/0300785 A1* | 10/2017 | Merhav | ................ G06K 9/6257 |

FOREIGN PATENT DOCUMENTS

| | | |
|---|---|---|
| CN | 106157319 A | 11/2016 |
| CN | 106295714 A | 1/2017 |

OTHER PUBLICATIONS

"Prisma", Wikipedia, edited Oct. 26, 2017, 1 page.
First Office Action, including Search Report, for Chinese Patent Application No. 201710060897.0, dated Mar. 21, 2019, 26 pages.
Simonyan Karen et al., "Very Deep Convolutional Networks for Large-Scale Image Recognition," Visual Geometry Group, Department of Engineering Science, University of Oxford, arXiv:1409.1556v6 [cs.CV], Apr. 10, 2015, 14 pages.

* cited by examiner

IMAGE PROCESSING METHOD AND DEVICE

CROSS-REFERENCE TO RELATED APPLICATION

The present application claims a priority of the Chinese patent application No. 201710060897.0 filed on Jan. 25, 2017, which is incorporated herein by reference in its entirety.

TECHNICAL FIELD

The present disclosure relates to an image processing method and an image processing device.

BACKGROUND

Currently, a deep learning technology on the basis of an artificial neural network has made great progress in such fields as image classification, image capturing and searching, face recognition, and age and speech recognition. An advantage of the deep learning technology lies in the solution of different technical problems using an all-purpose structure and a relatively similar system. A Convolutional Neural Network (CNN) is one of the artificial neural networks that has been recently developed and has attracted more and more attentions. As a special image recognition mode, the CNN is a very effective network with forward feedback. Currently, the CNN has been applied to, apart from image recognition, face recognition, word recognition, image processing, etc.

SUMMARY

In one aspect, the present disclosure provides in some embodiments an image processing method, including steps of extracting a feature of an inputted first image by a first CNN, and reconstructing and outputting an image by a second CNN. The first CNN includes a plurality of first convolutional layers connected sequentially to each other and a plurality of first pooling layers each arranged between respective adjacent first convolutional layers, and each first convolutional layer is configured to generate and output a first convolutional feature. The second CNN includes a plurality of second convolutional layers connected sequentially to each other and a plurality of composite layers each arranged between respective adjacent second convolutional layers, and each composite layer is an up-sampling layer. The number of the first convolutional layers is identical to the number of the second convolutional layers, and an output from the last one of the first convolutional layers is applied to the first one of the second convolutional layers. Apart from the first one of the plurality of second convolutional layers, at least one of the second convolutional layers is configured to receive the first convolutional feature from the respective first convolutional layer, and an output from the composite layer at an identical level is combined with the first convolutional feature outputted from the respective first convolutional layer to acquire output data.

In a possible embodiment of the present disclosure, in the above image processing method, apart from the first one of the plurality of second convolutional layers, each of the second convolutional layers is configured to receive the first convolutional feature outputted from the respective first convolutional layer, and the output from the composite layer at the identical level is combined with the first convolutional feature outputted from the respective first convolutional layer to acquire the output data.

In a possible embodiment of the present disclosure, in the above image processing method, each of the composite layers is configured to acquire input images in a first amount inputted to the composite layer, and interleave pixel values of the input images to generate output images in the first amount.

In a possible embodiment of the present disclosure, the image processing method further includes extracting a feature of an inputted third image by a third CNN. The third CNN includes a plurality of third convolutional layers connected sequentially to each other and a plurality of third pooling layers each arranged between respective adjacent third convolutional layers, and each of the third convolution layers is configured to generate and output a third convolutional feature. The number of the third convolutional layers is identical to the number of the first convolutional layers. Apart from the first one of the plurality of second convolutional layers and one of the second convolutional layers connected to the first convolutional layer, at least one of the second convolutional layers is configured to receive the third convolutional feature from the respective third convolutional layer, and an output from the composite layer at the identical level is combined with the third convolutional feature outputted from the respective third convolutional layer to acquire output data.

In a possible embodiment of the present disclosure, the image processing method further includes selecting and enabling at least one of the plurality of second convolutional layers to receive the output from the respective first convolutional layer or the respective third convolutional layer, and thereby selecting and enabling the first convolutional feature outputted from the respective first convolutional layer or the third convolutional feature outputted from the respective third convolutional layer to be combined with the output from the composite layer at the identical level to acquire the output data.

In a possible embodiment of the present disclosure, the image processing method further includes selecting and enabling each of the plurality of second convolutional layers to receive the output from the respective first convolutional layer or the respective third convolutional layer, and thereby selecting and enabling the first convolutional feature outputted from the respective first convolutional layer or the third convolutional feature outputted from the respective third convolutional layer to be combined with the output from the composite layer at the identical level to acquire the output data.

In a possible embodiment of the present disclosure, in the image processing method, the first convolutional feature is a content feature and the third convolutional feature is a style feature, or the first convolutional feature is the style feature and the third convolutional feature is the content feature.

In a possible embodiment of the present disclosure, in the image processing method, a structure of the first CNN is identical to a structure of the third CNN.

In another aspect, the present disclosure provides in some embodiments an image processing device, including a first CNN module and a second CNN module. The first CNN module is configured to extract a feature of an inputted first image by a first CNN. The first CNN includes a plurality of first convolutional layers connected sequentially to each other and a plurality of first pooling layers each arranged between respective adjacent first convolutional layers, and each first convolutional layer is configured to generate and output a first convolutional feature. The second CNN module is configured to reconstruct and output an image by a second CNN. The second CNN includes a plurality of second convolutional layers connected sequentially to each other and a plurality of composite layers each arranged between respective adjacent second convolutional layers, and each composite layer is an up-sampling layer. The number of the first convolutional layers is identical to the number of the second convolutional layers, and an output from the last one of the first convolutional layers is applied to the first one of the second convolutional layers. Apart from the first one of the plurality of second convolutional layers, at least one of the second convolutional layers is configured to receive the first convolutional feature from the respective first convolutional layer, and an output from the composite layer at an identical level is combined with the first convolutional feature outputted from the respective first convolutional layer to acquire output data.

In a possible embodiment of the present disclosure, in the image processing device, apart from the first one of the plurality of second convolutional layers, each of the second convolutional layers is configured to receive the first convolutional feature outputted from the respective first convolutional layer, and the output from the composite layer at the identical level is combined with the first convolutional feature outputted from the respective first convolutional layer to acquire the output data.

In a possible embodiment of the present disclosure, in the image processing device, each of the composite layers is configured to acquire input images in a first amount inputted to the composite layer, and interleave pixel values of the input images to generate output images in the first amount.

In a possible embodiment of the present disclosure, the image processing device further includes a third CNN module configured to extract a feature of an inputted third image by a third CNN. The third CNN includes a plurality of third convolutional layers connected sequentially to each other and a plurality of third pooling layers each arranged between respective adjacent third convolutional layers, and each of the third convolution layers is configured to generate and output a third convolutional feature. The number of the third convolutional layers is identical to the number of the first convolutional layers. Apart from the first one of the plurality of second convolutional layers and one of the second convolutional layers connected to the first convolutional layer, at least one of the second convolutional layers is configured to receive the third convolutional feature from the respective third convolutional layer, and an output from the composite layer at the identical level is combined with the third convolutional feature outputted from the respective third convolutional layer to acquire the output data.

In a possible embodiment of the present disclosure, the image processing device further includes a selection module configured to select and enable at least one of the plurality of second convolutional layers to receive the output from the respective first convolutional layer or the respective third convolutional layer, and thereby select and enable the first convolutional feature outputted from the respective first convolutional layer or the third convolutional feature outputted from the respective third convolutional layer to be combined with the output from the composite layer at the identical level to acquire the output data.

In a possible embodiment of the present disclosure, in the image processing device, the selection module is further configured to select and enable each of the plurality of second convolutional layers to receive the output from the respective first convolutional layer or the respective third convolutional layer, and thereby select and enable the first convolutional feature outputted from the respective first convolutional layer or the third convolutional feature outputted from the respective third convolutional layer to be combined with the output from the composite layer at the identical level to acquire the output data.

In a possible embodiment of the present disclosure, in the image processing device, a structure of the first CNN is identical to a structure of the third CNN.

In yet another aspect, the present disclosure provides in some embodiments an image processing device including a processor and a memory configured to store therein a computer program which is executed by the processor so as to implement the above-mentioned image processing method.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

Figure 1:
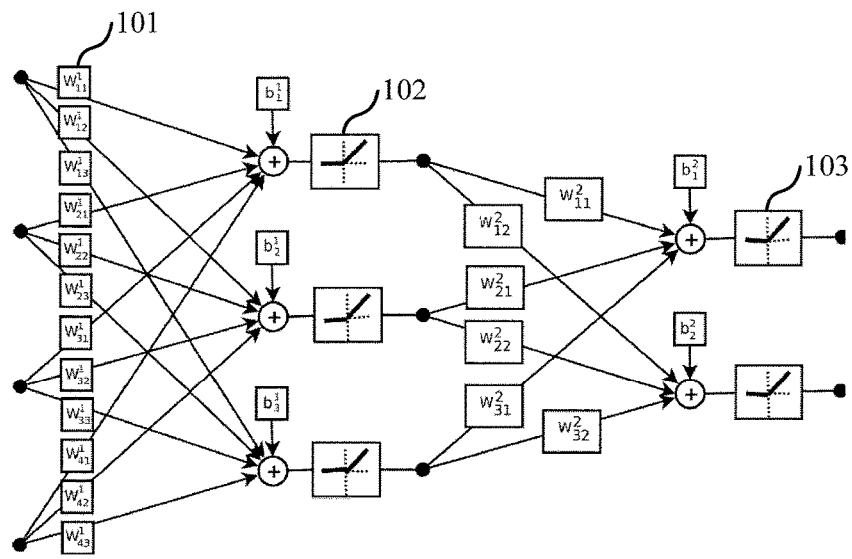
FIG. 1 is a schematic view briefly showing a neural network.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such word as "including" or "comprising" are merely used to represent that the element or unit presented prior to the word contains elements, units and the like enumerated subsequent to the word, instead of excluding other elements or units. Such words as "connect" or "connected to" may include electrical connection, direct or indirect, rather than to be limited to physical or mechanical connection.

Along with the development of the image processing technology, people have begun to search for a method for performing stylized migration treatment on an image, e.g., an inputted digital image is processed on the basis of a style of a reference image, so as to acquire an output image at least partially having the style. For example, in the case that the reference image is a work of a certain artist (e.g., Van Gogh or Monet), an original content of the output image may be reserved and meanwhile some features of the work of the artist may also be presented, and even the output image may be mistaken as a work of the artist. However, it is impossible for an image processing method in the related art (e.g., filters provided by Instagram) to acquire such a stylized migration treatment effect. Currently, a similar processing effect may be achieved through the latest deep leaning technology and the like.

For example, Leon A. Gatys et al. have proposed a method for image style migration using a CNN (see Leon A. Gatys, Alexander S. Echer, Matthias Bethge. A Neural Algorithm for Artistic Style. arXiv:1508.06576v2 [cs.CV], Sep. 2, 2015, which is incorporated herein by reference in its entirety as a part of the present application). This method mainly includes performing decomposition on an inputted picture at different levels through a trained CNN, and then creating a mapping relationship in terms of style representation and content reconstruction, so as to perform the style migration. It is able for this method to achieve a better stylized migration effect, but it is very complex and requires a large number of computing resources, so the processing speed thereof is slow and its commercialization is difficult.

An object of the present disclosure is to provide an image processing method and an image processing device, so as to achieve the image style migration, and make a compromise between the processing effect and the processing speed, i.e., to achieve a better stylized migration effect and process the image quickly or even in real time. Hence, the method and device in the embodiments of the present disclosure have a better and wider application prospect.

FIG. 1 is a schematic view briefly showing a neural network which is configured to, e.g. perform image processing, with images as an input and an output, and with filters (i.e., convolution) for replacing scalar weights. FIG. 1 shows a simple structure with three layers. As shown in FIG. 1, four input images are inputted to an input layer 101, an intermediate hidden layer 102 includes three units for outputting three output images, and an output layer 103 includes two units for outputting two output images. Each box in the input layer 101 having a weight $w_{ij}^k$ corresponds to a filter, where k is a label indicating a number of the input layer, and i and j are labels indicating an input unit and an output unit respectively. A bias $b_i^k$ is a scalar added to an output of the convolution. Several convolutions and biases are added to obtain a result, and the result is passed through an activation box. The result usually corresponds to a Rectification Linear Unit (ReLU), a sigmoid function or a hyperbolic tangent function. In an image processing system using the CNN, the filters and the biases are fixed during the operation of the system. The filters and the biases are acquired in advance using a set of input/output sample images by adjusting the set of input/output sample images to meet some application-dependent optimization standards.

Figure 2A:
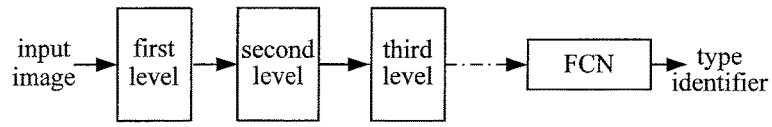
FIG. 2A is a schematic view showing a typical configuration of a CNN.
Figure 2B:
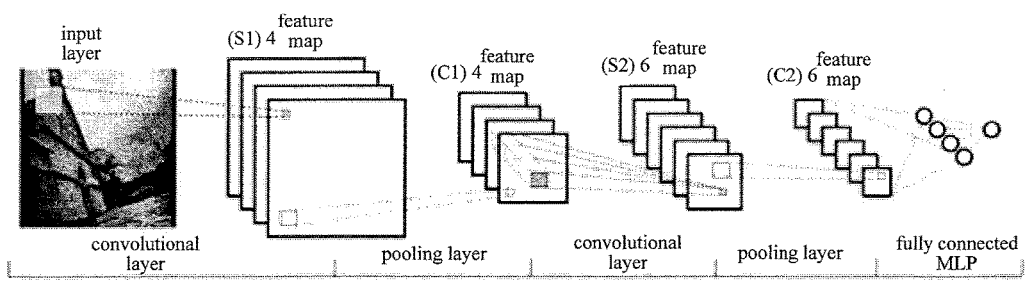
FIG. 2B is a schematic view abstractly showing an input and an output of a nerve cell in the CNN.

FIG. 2A shows a typical configuration of the CNN Image data is inputted to the CNN via the input layer, and then processed in several processing procedures (i.e., the layers in FIG. 2A), so as to output a recognition result. The processing procedure at each layer may include convolution and sub-sampling. If necessary, the processing procedure at each layer may further include normalization (e.g., Local Constant Normalization (LCN in the figure). FIG. 2B abstractly shows the input and output of one nerve cell in the CNN. As shown in FIG. 2B, C1, C2 to Cn represent different signal channels. With respect to a certain local receptive field (which includes a plurality of channels), the convolution may be performed on data over the C1 to Cn signal channels of the local receptive field through different filters, and a convolution result may be inputted to a stimulation node. Then, the stimulation node may perform calculation in accordance with a corresponding function, so as to acquire feature information. Hence, usually the CNN may mainly include a plurality of convolutional layers (CLs), a plurality of sub-sampling layers (also known as pooling layers (PLs)), and a fully convolutional network. A complete CNN may consist of these three kinds of layers superposed one on another.

As a core layer of the CNN, the convolutional layer may be configured to apply several filters to the input data (image), so as to extract various features. A result acquired after the application of one filter to the input data may be called as feature map, and the number of the feature maps is identical to the number of the filters. The feature map from one convolutional layer may be inputted to a next convolutional layer for processing, so as to acquire a new feature map. As an intermediate layer between two consecutive convolutional layers, the sub-sampling layer is configured to reduce a size of the input data, thereby to prevent the occurrence of an over-fitting phenomenon to some extent. For example, in the case that a 12*12 image is inputted and a 6*6 sub-sampling operation is made, a 2*2 output image may be acquired, and it means that 36 pixels of the original image are combined into one pixel of the output image. There are various methods for the sub-sampling, which include but not limited to max-pooling, avg-pooling, stochastic coalescence, decimation (e.g., the selection of a fixed pixel), demuxout (where the input image is divided into a plurality of small images), etc. Usually, the last sub-sampling layer or the convolutional layer is connected to one or more fully convolutional networks, and an output from the fully convolutional network, as a final output, may be a one-dimensional (1D) matrix, i.e., a vector.

Figure 3:
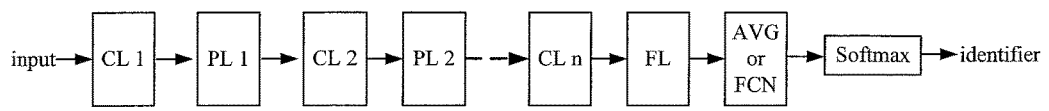
FIG. 3 is a schematic view showing an analyzing module using an input image from the CNN.

For another example, as shown in FIG. 3, the output image from the last convolutional layer (i.e., an $n^{th}$ convolutional layer) is inputted to a flattening module (flattening layer (FL)) for a flattening operation, so as to convert the feature image (a two-dimensional (2D) image) into a vector (a 1D matrix). This vector may be used for the fully convolutional network. The flattening operation may be performed using the following equation: $v_k = f_{k/j, k \% j}$, where v represents the vector including k elements, and f represents a matrix having i rows and j columns.

Then, an output from the flattening module is inputted to one fully convolutional network (FCN) which may be, e.g., the convolution network as shown in FIG. 1, with different scalars for replacing the filters.

For example, an averaging operation (AVG) may also be performed on an output from the last convolutional layer (i.e., an $L^{th}$ convolutional layer), i.e., an average value of the features may be used to represent the image, and thereby the 2D feature may be converted into one number. In the case of the averaging operation, no flattening module may be required.

The outputs of the neural network may be provided in various forms. For example, according to the practical need, an activation function for the output layer may be selected from the group consisting of a softmax function, a sigmoid function and a tan h function. Through the functions such as the softmax function, each label may be endowed with a certain probability, and the label having the largest probability may be selected as a label or type of the image.

A training procedure of the CNN may be implemented through improved counterpropagation, wherein the subsampling layers may be taken into consideration and the weights of the convolution filters may be updated on the basis of all values. In actual use, forward feedback fraction data may also be set, so as to facilitate the adjustment.

Figure 4A:
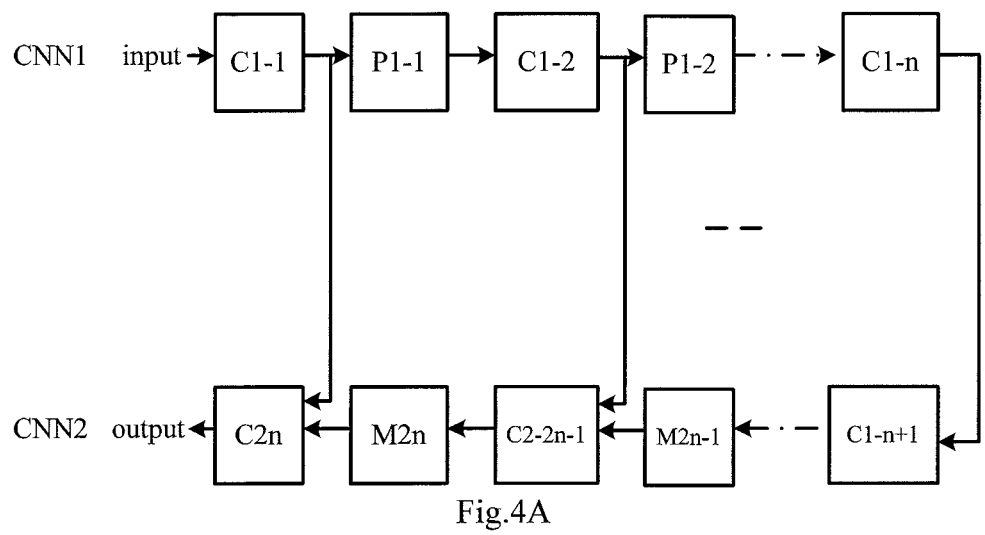
FIGS. 4A and 4B are schematic views showing an image processing device and an image processing method respectively according to at least one embodiment of the present disclosure.
Figure 4B:
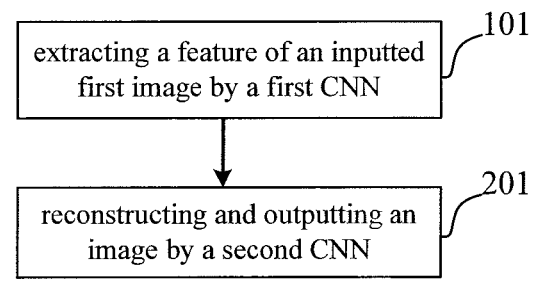

FIGS. 4A and 4B are schematic view showing an image processing device and an image processing method respectively according to at least one embodiment of the present disclosure. As shown in FIG. 4A, the image processing device includes two CNN. A first CNN (module) CNN1 is configured to extract a feature of an inputted first image, and a second CNN (module) CNN2 is configured to reconstruct and output an image. As compared with the analyzing module in FIG. 3, the image processing device in FIG. 4A does not include a flattening module, a fully convolutional network or a softmax module.

As shown in FIG. 4A, the to-be-processed first image may be inputted to the first CNN through, e.g. input layers (not shown), and processed by the first CNN so as to acquire feature data at different layers (i.e., the feature image). Then, the feature data at at least a part of the layers, e.g., the feature data at the last layer and the feature data at at least one of the previous layers, may be used by the second CNN for reconstructing the image. The reconstructed image may then be outputted from the second CNN. For example, the reconstructed image and the inputted first image may have an identical resolution, or different resolutions.

The first CNN CNN1 includes a plurality of first convolutional layers C1-1 to C1-$n$ connected sequentially to each other and arranged in a line, and a plurality of first pooling layers P1-1 to P1-$n$−1 each arranged between respective adjacent first convolutional layers. Apart from the last one of the first convolutional layers, i.e., C1-$n$, an output from each of the first convolutional layers is outputted to the respective first pooling layer at an identical level, and an output of the respective first pooling layer is then outputted to a next-level first convolutional layer. Each of the first convolutional layers is configured to generate and output a first convolutional feature.

The second CNN CNN2 includes a plurality of second convolutional layers C2-$n$+1 to C2-2$n$ connected sequentially to each other and arranged in a line, and a plurality of composite layers M$n$+1 to M2$n$ each arranged between respective adjacent second convolutional layers. Apart from the last one of the second convolutional layers, i.e., C2-2$n$, an output from a current-level second convolutional layer is outputted to a next-level composite layer, and an output of the composite layer is then outputted to a second convolutional layer at an identical level. The composite layer is an up-sampling layer.

The number of the first convolutional layers of the first CNN CNN1 is identical to the number of the second convolutional layers of the second CNN CNN2. As shown in FIG. 4A, the first convolutional layers C1-1 to C1-$n$ correspond to the second convolutional layers C2-$n$+1 to C2-2$n$ respectively in a reverse order, and correspondingly, the first pooling layers P1-1 to P1-$n$−1 correspond to the composite layers M$n$+1 to M2$n$ respectively in a reverse order. An output from the last one of the first convolutional layers, i.e., C1-$n$, is applied to (through signal connection) the first one of the second convolutional layers, i.e., C2-$n$+1, i.e., the data from the first convolutional layer C1-$n$ may be applied to the second convolutional layer C2-$n$+1. Apart from the first one of the plurality of second convolutional layers, at least one of the second convolutional layers is configured to receive the first convolutional feature from the respective first convolutional layer, and an output from the composite layer at an identical level is combined with the first convolutional feature from the respective first convolutional layer to acquire output data. The output data may be processed layer by layer, so as to reconstruct the image. For example, apart from the first one of the second convolutional layers, it is unnecessary for each of the second convolutional layers to receive the output from the respective first convolutional layer.

For another example, apart from the first one of the plurality of second convolutional layers, each of the second convolutional layers is configured to receive the first convolutional feature from the respective first convolutional layer, and the output from the composite layer at an identical level is combined with the first convolutional feature from the respective first convolutional layer to acquire the output data.

As shown in FIG. 4B, in this embodiment, the image processing method includes: Step 101 of extracting the feature of the inputted first image by the first CNN; and Step of 201 of reconstructing and outputting the image by the second CNN.

The composite layer is an up-sampling layer of the CNN and configured to add values in various dimensions to the inputted image data, thereby to increase the data volume and facilitate the reconstruction of the image.

Figure 5A:
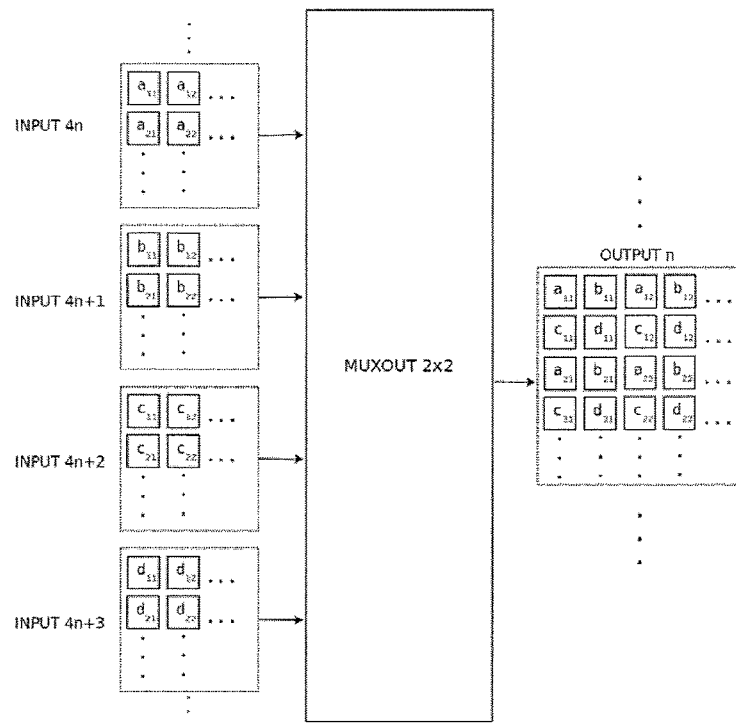
FIGS. 5A and 5B are schematic views each showing a composite layer.

Usually, an up-sampling method includes interpolation method and the like. FIG. 5A shows the composite layer for up-sampling using a pixel interpolation method in an embodiment of the present disclosure. In FIG. 5A, at the composite layer, a 2*2 multiplication factor may be used, so as to combine four feature images, thereby to acquire one feature image having a fixed pixel order.

In another possible embodiment of the present disclosure, for a 2D feature image, the composite layer of the second CNN may acquire input images in a first amount and interleave pixel values of the input images so as to generate output images in the first amount. As compared with the input images (the feature images), the number of the output images remains unchanged, but a size of each feature image is increased by a respective multiplication factor. Hence, more combinations may be used by the composite layer so as to add more information into the feature image for the next layer. These combinations may include all possible up-sampling combinations, and one or more of them may be selected using an activation function.

Figure 5B:
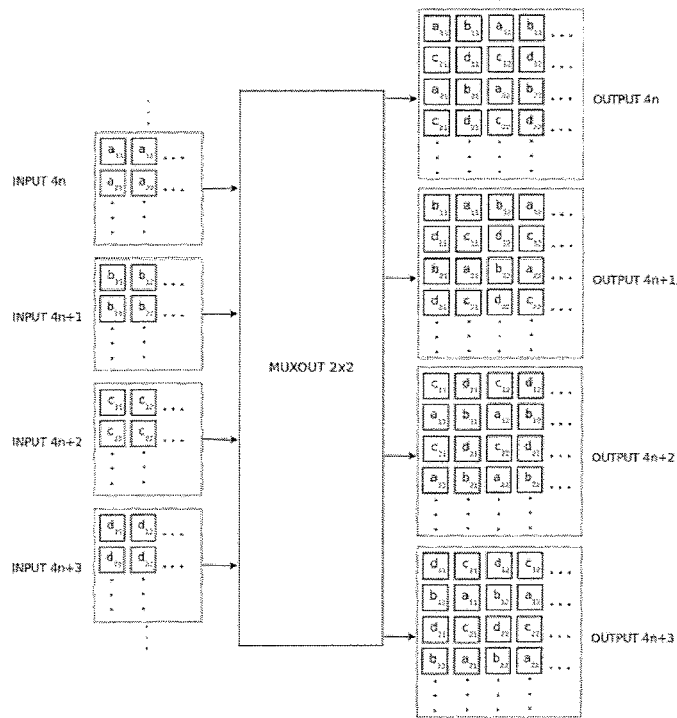

FIG. 5B shows the composite layer for up-sampling using an interleaving method in another embodiment of the present disclosure. In FIG. 5B, at the composite layer, a 2*2 multiplication factor may also be used, i.e., four input images may be grouped into one group, and their pixel values may be interleaved so as to generate four output feature images. The number of the output images from the composite layer remains unchanged, but a size of each feature image is increased by three times, i.e., each feature image includes the pixels four times those in the original one.

Referring again to FIG. 4A, the first CNN includes n convolutional layers, i.e., C1-1 to C1-$n$, where n is usually greater than 3, and even more than one hundred. Along with the increase in the number of the first convolutional layers, the first convolutional layer at a higher level may be used to extract the feature in a higher order. The first convolutional feature extracted by each first convolutional layer may be a content feature of the input image. The first CNN may be implemented by such neural network models as AlexNet, GoogleNet, VGG, Deep Residual Learning, so as to acquire the content feature of the input image. A VGG network developed by a Visual Geometry Group of University of Oxford has been widely used for visual recognition. The VGG network may include, e.g., 19 layers, and some of these layers may be subjected to normalization. The second convolutional layers of the second CNN may also be implemented using the convolutional layers in the above-mentioned neural network models.

In the embodiments of the present disclosure, apart from the first one of the plurality of second convolutional layers, at least one of the second convolutional layers may be configured to receive the first convolutional feature from the respective first convolutional layer, and the output from the composite layer at an identical level is combined with the first convolutional feature from the respective first convolutional layer to acquire the output data. In this case, it is able to ensure the quality of the reconstructed image. In addition, apart from the first one of the plurality of second convolutional layers, each of the second convolutional layers may be configured to receive the first convolutional feature from the respective first convolutional layer, and the output from the composite layer at an identical level is combined with the first convolutional feature from the respective first convolutional layer to acquire the output data. In this case, the output image from the second CNN may be close to the input image inputted to the first CNN to a great extent.

Figure 6:
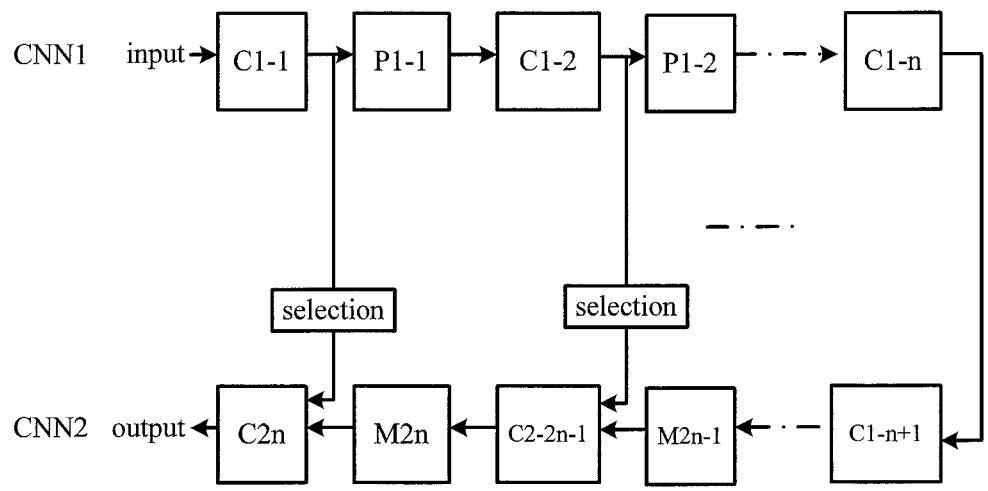
FIG. 6 is a schematic view showing an image processing device according another embodiment of the present disclosure.

FIG. 6 is a schematic view showing an image processing device according another embodiment of the present disclosure. As compared with FIG. 4, the image processing device in FIG. 6 further includes a selection module configured to select processing results of some of the first convolutional layers of the first CNN to be outputted to the respective second convolutional layers of the second CNN for the subsequent processing. In this embodiment, a content feature set C (C=[$C_1, C_2, \ldots, C_{n-1}$]) may be inputted to the selection module, and a feature set F (F=[$F_1, F_2, \ldots, F_{n-1}$]) may be outputted from the selection module.

A filter set $\alpha$ ($\alpha$=[$\alpha_1, \alpha_2, \ldots, \alpha_{n-1}$], $\alpha$ is 0 or 1) may be defined with respect to the selection module, and each element in the filter set $\alpha$ may be a Boolean variable and have a value of 0 or 1.

In addition, the value of $\alpha$ may be preset, or acquired after the training and adjustment. Hence, a mapping relationship between the output feature set F and the input feature set C may be represented as $F_x=C_x$, $\alpha_x=1$.

In FIG. 6, the layers, from which the feature images are used for the reconstruction, may be selected according to the practical need. Correspondingly, the image processing method in FIG. 4B may further include selecting the processing results of some of the first convolutional layers of the first CNN to be outputted to the respective second convolutional layers of the second CNN for the subsequent processing.

Figure 7A:
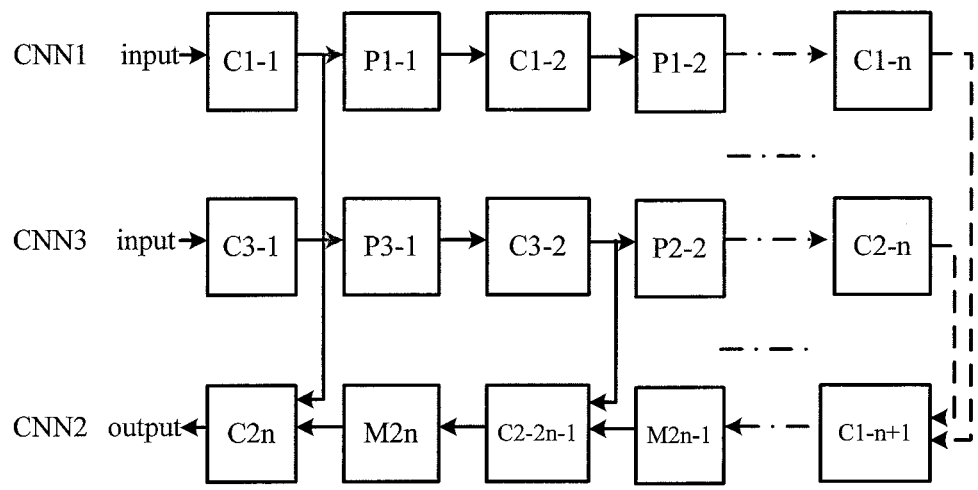
FIGS. 7A and 7B are schematic views showing an image processing device and an image processing method respectively according to yet another embodiment of the present disclosure.
Figure 7B:
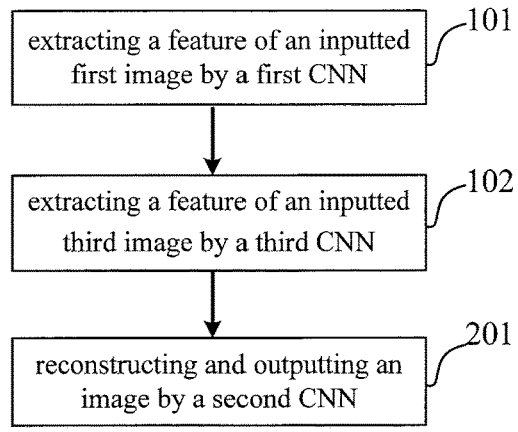

FIGS. 7A and 7B are schematic views showing an image processing device and an image processing method respectively according to yet another embodiment of the present disclosure. As shown in FIG. 7A, the image processing device includes three CNNs, i.e., the first CNN (module) CNN1 configured to extract the first feature of the inputted first image, a third CNN (module) CNN3 configured to extract a third feature of an inputted third image, and the second CNN (module) CNN2 configured to reconstruct and output the image. As compared with that in FIG. 4A, the image processing device further includes the third CNN CNN3.

As shown in FIG. 7A, the first image may be inputted to the first CNN through, e.g. input layers (not shown) of the first CNN, and processed by the first CNN so as to acquire first feature data at different layers (i.e., the feature images). Then, the first feature data at the last one of the first convolutional layers and the first feature data at at least one of the previous first convolutional layers may be used by the second CNN for reconstructing the image. Correspondingly, the to-be-processed third image may be inputted to the third CNN through, e.g. input layers (not shown) of the third CNN, and processed by the third CNN so as to acquire second feature data at different layers (i.e., the feature images). Then, the second feature data at the last one of the third convolutional layers and the second feature data at at least one of the previous third convolutional layers may be used by the second CNN for reconstructing the image. The reconstructed image may then be outputted from the second CNN. The first image may be different from the third image. Hence, it is able to combine the different input images so as to generate a new output image.

The third CNN CNN3 includes a plurality of third convolutional layers C3-1 to C3-$n$ connected sequentially to each other and arranged in a line and a plurality of third pooling layers P3-1 to P3-$n$−1 each arranged between respective adjacent third convolutional layers. Apart from the last one of the third convolutional layers, i.e., C3-$n$, an output from each of the third convolutional layers is outputted to the respective third pooling layer at an identical level, and then an output of the third pooling layer is outputted to a next-level third convolutional layer. Each of the third convolutional layers is configured to generate and output a third convolutional feature.

The number of the third convolutional layers of the third CNN CNN3 is identical to the number of the first convolutional layers of the first CNN CNN1. As shown in FIG. 7, the first convolutional layers C1-1 to C1-$n$ correspond to the third convolutional layers C3-1 to C3-2$n$ respectively, and correspondingly, the first pooling layers P1-1 to P1-$n$−1 correspond to the third pooling layers P3-1 to P3-$n$−1 respectively. An output from the last one of the third convolutional layers, i.e., C3-$n$, is applied to (through signal connection) the first one of the second convolutional layers, i.e., C2-$n$+1, i.e., the data from the third convolutional layer C3-$n$ may be applied to the second convolutional layer C2-$n$+1. Apart from the first one of the plurality of second convolutional layers, at least one of the second convolutional layers is configured to receive the first convolutional feature from the respective first convolutional layer, and an output from the composite layer at an identical level is combined with the first convolutional feature from the respective first convolutional layer to acquire output data. The output data may be processed layer by layer, so as to reconstruct the image. For example, apart from the first one of the second convolutional layers, it is unnecessary for each of the second convolutional layers to receive the output from the respective third convolutional layer. In addition, the same second convolutional layer may not receive the output from the respective first convolutional layer and the output from the respective third convolutional layer simultaneously. As shown in FIG. 7, the first one of the second convolutional layers, i.e., C2-$n$+1, may receive the output from the last one of the first convolutional layers, i.e., C1-$n$ or the last one of the third convolutional layers, i.e., C3-$n$ (as shown by dotted lines in FIG. 7).

For another example, apart from the first one of the plurality of second convolutional layers, each second convolutional layer may receive either the first convolutional feature from the respective first convolutional layer, or the output from the respective second convolutional layer, and the output from the composite layer at an identical level is combined with the first convolutional feature from the respective first convolutional layer or the third convolutional feature from the respective third convolutional layer, so as to acquire the output data. The output data is processed layer by layer, so as to reconstruct the image. The reconstructed output image may have a resolution identical to the first image.

The third CNN includes n convolutional layers, i.e., C3-1 to C3-$n$, and the third convolutional feature extracted by each of the third convolutional layers may be a style feature of the input image. The third CNN may also be implemented by such a neural network model as AlexNet, GoogleNet, VGG or Deep Residual Learning, so as to extract the style feature of the input image. For example, the first convolutional feature may be a content feature and the third convolutional feature may be a style feature, or vice versa. The first CNN and the third CNN may be of an identical structure, e.g., they may be both VGG networks.

In order to acquire style feature representation of the input image, a feature space for texture information may be captured through a design. The feature space may be created on the basis a filter response in any layer of the CNN, and it may consist of correlation between different filter responses. The feature correlation may be represented by a Gram matrix ($G^l \in R^{N_l \times N_l}$), where $G_{ij}^l$ is an inner product of vector feature maps i and j in an $l^{th}$ layer, wherein $$G_{i,j}^l = \sum_k F_{ik}^l F_{jk}^l.$$

Through the feature correlation for multiple layers, it is able to acquire a static, multi-scale representation of the input image, thereby to extract the texture information about, rather than a global layout of, the input image, and acquire the style feature.

In a possible embodiment of the present disclosure, the second CNN may combine the content feature of the first input image from the first CNN with the style feature of the second input image from the third CNN, so as to acquire a new image capable of visually representing the content of the first input image and the style of the second input image.

As shown in FIG. 7B, the image processing method includes: Step 101 of extracting the feature of the inputted first image by the first CNN; Step 102 of extracting the feature of the inputted third image by the third CNN; and Step 201 of reconstructing and outputting the image by the second CNN.

Figure 8:
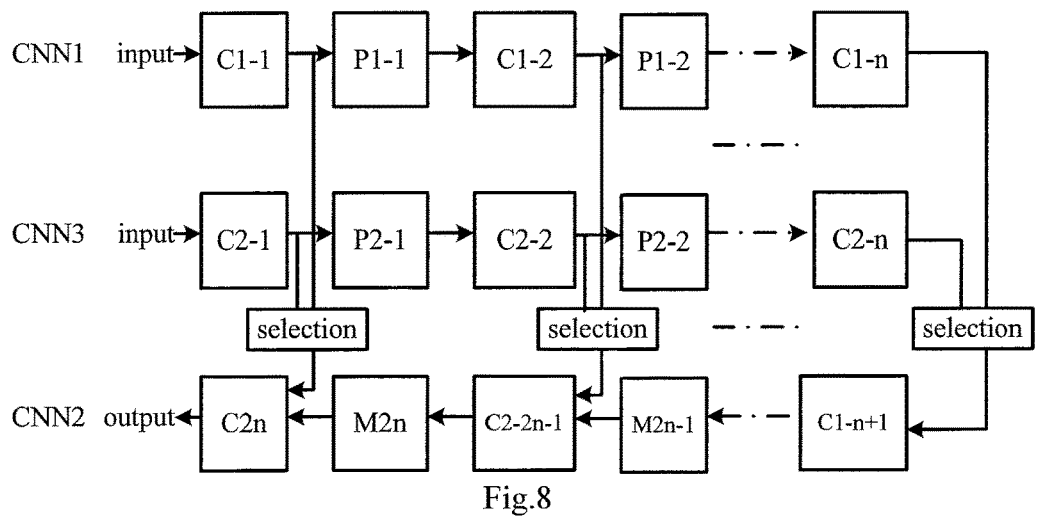
FIG. 8 is a schematic view showing an image processing device according to still yet another embodiment of the present disclosure.

FIG. 8 is a schematic view showing an image processing device according to still yet another embodiment of the present disclosure. As compared with FIG. 7A, the image processing device in FIG. 8 may further include a selection module configured to select processing results of some of the first convolutional layers of the first CNN or processing results of some of the third convolutional layers of the third CNN to the respective second convolutional layers of the second CNN for the subsequent processing. In this embodiment, a content feature set C (C=[$C_1, C_2, \ldots, C_{n-1}$]) and a style feature set S (S=[$S_1, S_2, \ldots, S_{n-1}$]) may be inputted to the selection module, and a feature set F (F=[$F_1, F_2, \ldots, F_{n-1}$]) may be outputted from the selection module.

A filter set α ($\alpha=[\alpha_1, \alpha_2, \ldots, \alpha_{n-1}]$, a is 0 or 1) may be defined with respect to the selection module, and each element in the filter set α may be a Boolean variable and have a value of 0 or 1.

In addition, the value of a may be preset, or acquired after the training and adjustment. Hence, a mapping relationship between the output feature set F and the input feature set C may be represented as $$F_x = \begin{cases} C_x, & \alpha_x = 1 \\ S_x, & \alpha_x = 0 \end{cases}.$$

In FIG. 8, the layers, from which the feature images are used for the reconstruction, may be selected according to the practical need. Correspondingly, in the case that the image processing device further includes the selection module, the image processing method in FIG. 7B may further include selecting and enabling at least one or each of the plurality of second convolutional layers to receive the output from the respective first convolutional layer or the respective third convolutional layer, and thereby the first convolutional feature from the respective first convolutional layer or the third convolutional feature from the respective third convolutional layer is selected to be combined with the output from the composite layer at an identical level, so as to acquire the output data.

Figure 9:
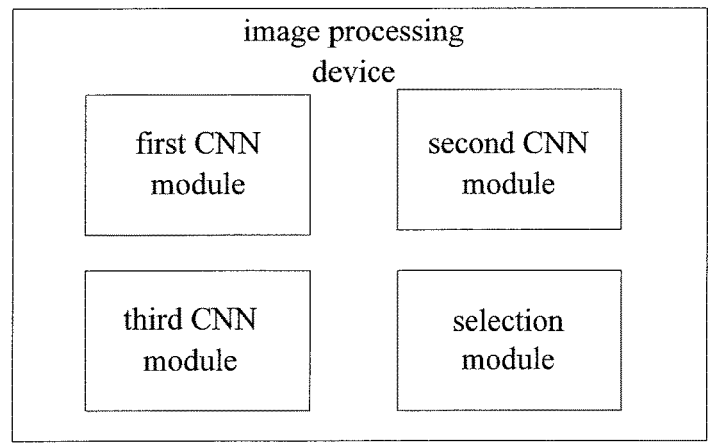
FIG. 9 is a schematic view showing an image processing device according to still yet another embodiment of the present disclosure.

FIG. 9 is a schematic view showing the image processing device including the first, second and third CNN modules, and the selection module.

Figure 10:
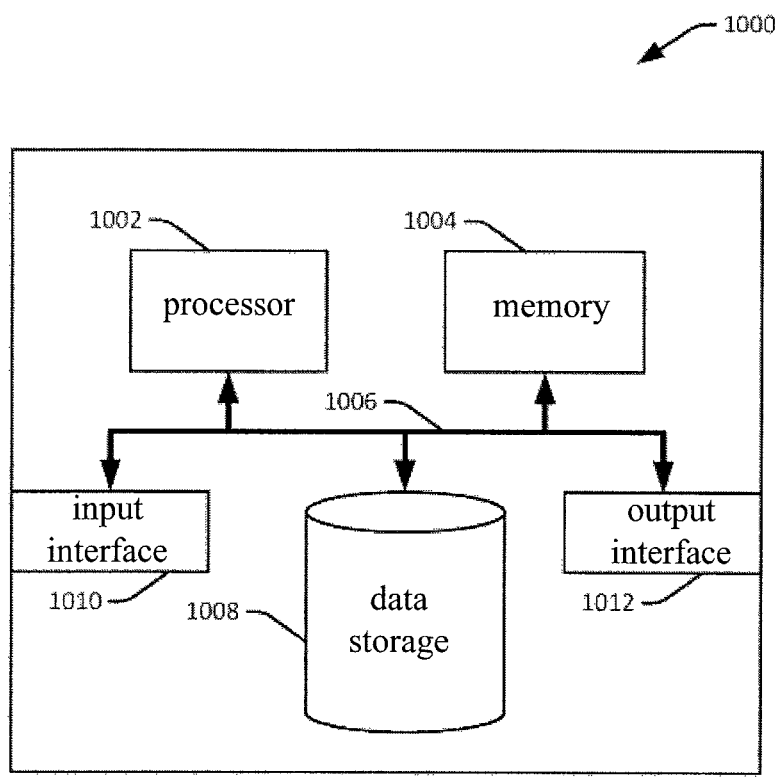
FIG. 10 is a schematic view showing a computing device capable of implementing the image processing method in the present disclosure.

FIG. 10 shows a computing device 1000 for implementing the image processing method. The computing device 1000 includes at least one processor 1002 configured to execute instructions stored in a memory 1004. These instructions may be instructions for implementing functions described to be executed by one or more of the above-mentioned modules, or instructions for implementing one or more steps of the above-mentioned method. The processor 1002 may access to the memory 1004 through a system bus 1006. Apart from the executable instructions, the memory 1004 may also be configured to store therein training data. The processor 1002 may be an element having a computing capability such as a Central Processing Unit (CPU) or a Graphics Processing Unit (GPU). The CPU may be an X86 or ARM (Advanced RISC (Reduced Instruction Set Computing) Machine) processor. The GPU may be individually, directly integrated into a mainboard, or built in a north bridge chip of the mainboard, or built in the CPU. Due to its strong image processing capability, in a possible embodiment of the present disclosure, the GPU may be used to train the CNNs and perform the image processing operation on the basis of the CNNs.

The computing device 1000 may further include a data storage 1008 to which the processor 1002 may access through the system bus 1006. The data storage 1008 may include the executable instructions, multi-image training data, etc. The computing device 1000 may further include an input interface 1010 for allowing an external device to communicate with the computing device 1000. For example, the input interface 1010 may be configured to receive an instruction from, e.g. the external device or a user. The computing device 1000 may further include an output interface 1012 for allowing the computing device 1000 to be connected to one or more external devices. For example, the computing device 1000 may be configured to display an image through the output interface 1012. The external device capable of communicating with the computing device 1000 through the input interface 1010 and the output interface 1012 may be applied to an environment capable of providing a user interface of any type with which the user may interact. The user interface may include, e.g. a Graphical User Interface (GUI) or a natural language interface. For example, through the GUI, the user may input the data using an input device such as a keyboard, a mouse or a remote controller, and output the data using an outputting device such as a display. In addition, through the natural language interface, the user may interact with the computing device 1000 without any input device such as a keyboard, a mouse or a remote controller. To be specific, the natural language interface may be dependent on speech recognition, touch or stylus recognition, gesture recognition on or in proximity to a screen, mid-air gesture, head and eye tracking, speech, vision, touch, gesture or machine intelligence.

In addition, although the computing device 1000 is shown in FIG. 10 as a single system, it should be appreciated that, it may also be a distributed system, or a cloud (public or private cloud). Hence, for example, several devices may communicate with each other through a network and together execute a task described to be executed by the computing device 1000.

The functions described hereinabove (including but not limited to the functions of the first, second and third CN modules as well as the selection module) may be implemented by hardware, software, firmware or any combination thereof. In the case that these functions are implemented by the software, they may serve as one or more instructions or codes stored in a computer-readable medium or transmitted thereby. The computer-readable medium includes a computer-readable storage medium which may be any available storage medium capable of being accessed by a computer. The computer-readable medium may include, but not limited to, Random Access Memory (RAM), Read Only Memory (ROM), Electrically Erasable Programmable Read Only Memory (EEPROM), Compact Disc-ROM (CD-ROM) or any other optical disc, magnetic disc or any other magnetic storage device, or any other medium capable of being used to carry or store therein a desired program code in the form of an instruction or data form and capable of being accessed by the computer. In addition, a signal to be transmitted may not belong to the computer-readable storage medium. The computer-readable medium may further include a communication medium, which may include any medium capable of enabling a computer program to be transferred from one place to another. The connection may be implemented via the communication medium. For example, in the case that the software is configured to acquire the data from a web site, a server or any other remote source using a coaxial cable, an optical fiber, a twisted paired cable, a Digital Subscriber Line (DSL), or a wireless technique such as infrared, radio or microwave, the communication medium may include the coaxial cable, the optical fiber, the twisted paired cable, the Digital Subscriber Line (DSL), or the wireless technique such as infrared, radio or microwave, as well as the combination thereof. Alternatively, at least parts of the functions described herein may be implemented by one or more hardware logic assemblies or circuits. For example, the available hardware logic assemblies may include, but not limited to, a Field Programmable Gate Array (FPGA), an Application Specific Integrated Circuit (ASIC), an Application Specific Standard Product (ASSP), a System On Chip (SOC) or a Complex Programmable Logic Device (CPLD).

According to the image processing method and the image processing device in the embodiments of the present disclosure, in the case of processing the image, e.g., combining two images, especially performing stylized migration of the image, it is able to improve a stylized migration effect, and process the image quickly or even in real time. Hence, the method and device in the embodiments of the present disclosure have a better and wider application prospect.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An image processing method, comprising:
   extracting one or more features of an inputted first image by a first Convolutional Neural Network (CNN), the inputted first image being inputted to the first one of the first convolutional layers, wherein the first CNN comprises a plurality of first convolutional layers connected sequentially to each other and a plurality of first pooling layers each connected to and arranged between respective adjacent first convolutional layers, and each of the first convolutional layers is configured to generate and output a first convolutional feature; and
   reconstructing the inputted first image and outputting the reconstructed image after reconstruction by a second CNN, wherein the second CNN comprises a plurality of second convolutional layers connected sequentially to each other and a plurality of second composite layers each connected to and arranged between respective adjacent second convolutional layers, and each of the second composite layers is an up-sampling layer, wherein
   the number of the first convolutional layers is identical to the number of the second convolutional layers,
   an outputted image from the last one of the first convolutional layers is applied to the first one of the second convolutional layers,
   apart from the first one of the plurality of second convolutional layers, at least one of the second convolutional layers is configured to receive the first convolutional feature outputted from the corresponding first convolutional layer, and
   an output from the second composite layer at an identical level started from the first one of the second convolutional layers is combined with the first convolutional feature outputted from the corresponding first convolutional layer to acquire a final output image data.

2. The image processing method according to claim 1, wherein apart from the first one of the plurality of second convolutional layers, each of the second convolutional layers is configured to receive the first convolutional feature outputted from the respective first convolutional layer, and the output from the second composite layer at the identical level started from the first one of the second convolutional lavers is combined with the first convolutional feature outputted from the respective first convolutional layer to acquire the final output image data.

3. The image processing method according to claim 1, wherein each of the second composite layers is configured to acquire input images inputted to the second composite layer, and interleave pixel values of the input images to generate output images, wherein the number of the acquired images is identical to the number of the generated output images.

4. The image processing method according to claim 1, further comprising: extracting a feature of an inputted third image by a third CNN, wherein the third CNN comprises a plurality of third convolutional layers connected sequentially to each other and a plurality of third pooling layers each connected to and arranged between respective adjacent third convolutional layers, and each of the third convolution layers is configured to generate and output a third convolutional feature;

the number of the third convolutional layers is identical to the number of the first convolutional layers; and apart from the first one of the plurality of second convolutional layers and one of the second convolutional layers that is connected to the first convolutional layer, at least one of the second convolutional layers is configured to receive the third convolutional feature outputted from the respective third convolutional layer, and an output from the second composite layer at the identical level started from the first one of the second convolutional layers is combined with the third convolutional feature outputted from the respective third convolutional layer to acquire the final output image data.

5. The image processing method according to claim 4, further comprising:

selecting and enabling at least one of the plurality of second convolutional layers to receive the output from the respective first convolutional layer or the respective third convolutional layer, and thereby selecting and enabling the first convolutional feature outputted from the respective first convolutional layer or the third convolutional feature outputted from the respective third convolutional layer to be combined with the output from the second composite layer at the identical level started from the first one of the second convolutional layers to acquire the final output image data.

6. The image processing method according to claim 5, wherein the first convolutional feature is a content feature and the third convolutional feature is a style feature; or the first convolutional feature is the style feature and the third convolutional feature is the content feature.

7. The image processing method according to claim 4, further comprising:

selecting and enabling each of the plurality of second convolutional layers to receive the output from the respective first convolutional layer or the respective third convolutional layer, and thereby selecting and enabling the first convolutional feature outputted from the respective first convolutional layer or the third convolutional feature outputted from the respective third convolutional layer to be combined with the output from the second composite layer at the identical level started from the first one of the second convolutional lavers to acquire the final output image data.

8. The image processing method according to claim 4, wherein a structure of the first CNN is identical to a structure of the third CNN.

9. An image processing device, comprising:

a first Convolutional Neural Network (CNN) circuit configured to extract one or more features of an inputted first image by a first CNN, the inputted first image being inputted to the first one of the first convolutional layers, wherein the first CNN comprises a plurality of first convolutional layers connected sequentially to each other and a plurality of first pooling layers each connected to and arranged between respective adjacent first convolutional layers, and each of the first convolutional layers is configured to generate and output a first convolutional feature; and a second CNN circuit configured to reconstruct the inputted first image and output the reconstructed image after reconstruction by a second CNN, wherein the second CNN comprises a plurality of second convolutional layers connected sequentially to each other and a plurality of second composite layers each connected to and arranged between respective adjacent second convolutional layers, and each of the second composite layers is an up-sampling layer, wherein the number of the first convolutional layers is identical to the number of the second convolutional layers, an outputted image from the last one of the first convolutional layers is applied to the first one of the second convolutional layers, apart from the first one of the plurality of second convolutional layers, at least one of the second convolutional layers is configured to receive the first convolutional feature outputted from the corresponding first convolutional layer, and an output from the second composite layer at an identical level started from the first one of the second convolutional layers is combined with the first convolutional feature outputted from the corresponding first convolutional layer to acquire a final output image data.

10. The image processing device according to claim 9, wherein apart from the first one of the plurality of second convolutional layers, each of the second convolutional layers is configured to receive the first convolutional feature outputted from the respective first convolutional layer, and the output from the second composite layer at the identical level started from the first one of the second convolutional layers is combined with the first convolutional feature outputted from the respective first convolutional layer to acquire the final output image data.

11. The image processing device according to claim 9, wherein each of the second composite layers is configured to acquire input images inputted to the second composite layer, and interleave pixel values of the input images to generate output images, wherein the number of the acquired input images is identical to the number of generated output images.

12. The image processing device according to claim 9, further comprising a third CNN circuit configured to extract a feature of an inputted third image by a third CNN, wherein the third CNN comprises a plurality of third convolutional layers connected sequentially to each other and a plurality of third pooling layers each connected to and arranged between respective adjacent third convolutional layers, and each of the third convolution layers is configured to generate and output a third convolutional feature;

the number of the third convolutional layers is identical to the number of the first convolutional layers; and apart from the first one of the plurality of second convolutional layers and one of the second convolutional layers that is connected to the first convolutional layer, at least one of the second convolutional layers is configured to receive the third convolutional feature outputted from the respective third convolutional layer, and an output from the second composite layer at the identical level started from the first one of the second convolutional layers is combined with the third convolutional feature outputted from the respective third convolutional layer to acquire the final output image data.

13. The image processing device according to claim 12, further comprising a selection circuit configured to select and enable at least one of the plurality of second convolutional layers to receive the output from the respective first convolutional layer or the respective third convolutional layer, and thereby select and enable the first convolutional feature outputted from the respective first convolutional layer or the third convolutional feature outputted from the respective third convolutional layer to be combined with the output from the second composite layer at the identical level started the first one of the second convolutional layers to acquire the final output image data.

14. The image processing device according to claim 13, wherein the selection circuit is further configured to select and enable each of the plurality of second convolutional layers to receive the output from the respective first convolutional layer or the respective third convolutional layer, and thereby select and enable the first convolutional feature outputted from the respective first convolutional layer or the third convolutional feature outputted from the respective third convolutional layer to be combined with the output from the second composite layer at the identical level started from the first one of the second convolutional layers to acquire the final output images data.

15. The image processing device according to claim 12, wherein a structure of the first CNN is identical to a structure of the third CNN.

16. An image processing device, comprising a processor and a memory configured to store therein a computer program, wherein the processor is configured to execute the computer program to:

extract one or more features of an inputted first image by a first Convolutional Neural Network (CNN), the inputted first image being inputted to the first one of the first convolutional layers, wherein the first CNN comprises a plurality of first convolutional layers connected sequentially to each other and a plurality of first pooling layers each connected to and arranged between respective adjacent first convolutional layers, and each of the first convolutional layers is configured to generate and output a first convolutional feature; and reconstruct the inputted first images and outputting the reconstructed image after reconstruction by a second CNN, wherein the second CNN comprises a plurality of second convolutional layers connected sequentially to each other and a plurality of second composite layers each connected to and arranged between respective adjacent second convolutional layers, and each of the second composite layers is an up-sampling layer, wherein the number of the first convolutional layers is identical to the number of the second convolutional layers, an outputted image from the last one of the first convolutional layers is applied to the first one of the second convolutional layers, apart from the first one of the plurality of second convolutional layers, at least one of the second convolutional layers is configured to receive the first convolutional feature outputted from the corresponding first convolutional layer, and an output from the second composite layer at an identical level started from the first one of the second convolutional layers is combined with the first convolutional feature outputted from the corresponding first convolutional layer to acquire a final output image data.

17. The image processing device according to claim 16, wherein apart from the first one of the plurality of second convolutional layers, each of the second convolutional layers is configured to receive the first convolutional feature outputted from the respective first convolutional layer, and the output from the second composite layer at the identical level started from the first one of the second convolutional layers is combined with the first convolutional feature outputted from the respective first convolutional layer to acquire the output data.

18. The image processing device according to claim 16, wherein each of the second composite layers is configured to acquire input images inputted to the second composite layer, and interleave pixel values of the input images to generate output images, wherein the number of the acquired input images is identical to the number of the generated output images.

19. The image processing device according to claim 16, wherein the processor is further configured to extract a feature of an inputted third image by a third CNN, wherein the third CNN comprises a plurality of third convolutional layers connected sequentially to each other and a plurality of third pooling layers each connected to and arranged between respective adjacent third convolutional layers, and each of the third convolution layers is configured to generate and output a third convolutional feature;

the number of the third convolutional layers is identical to the number of the first convolutional layers; and apart from the first one of the plurality of second convolutional layers and one of the second convolutional layers that is connected to the first convolutional layer, at least one of the second convolutional layers is configured to receive the third convolutional feature outputted from the respective third convolutional layer, and an output from the second composite layer at the identical level started from the first one of the second convolutional layers is combined with the third convolutional feature outputted from the respective third convolutional layer to acquire the final output image data.

20. The image processing device according to claim 19, wherein the processor is further configured to select and enable at least one of the plurality of second convolutional layers to receive the output from the respective first convolutional layer or the respective third convolutional layer, and thereby select and enable the first convolutional feature outputted from the respective first convolutional layer or the third convolutional feature outputted from the respective third convolutional layer to be combined with the output from the second composite layer at the identical level started from the first one of the second convolutional layers to acquire the final output image data.

* * * * *